United States Patent
Chen et al.

(10) Patent No.: US 6,938,487 B2
(45) Date of Patent: Sep. 6, 2005

(54) INERTIA SENSOR

(75) Inventors: Yi-Ru Chen, YunLin (TW); Kai-Cheng Chang, Taipei (TW); Guang-Chyeng Fang, Hsinchu (TW); Ming-Hsiu Hsu, NanTou (TW); Pei-Fang Liang, YunLin (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/694,221

(22) Filed: Oct. 28, 2003

(65) Prior Publication Data

US 2005/0028592 A1 Feb. 10, 2005

(30) Foreign Application Priority Data

Aug. 5, 2003 (TW) .......................... 92121324 A

(51) Int. Cl.$^7$ ............................................ G01P 15/08
(52) U.S. Cl. ................................. 73/514.36; 73/514.32
(58) Field of Search .................... 73/514.36, 514.37, 73/514.38, 514.32, 514.21, 514.23, 514.24

(56) References Cited

U.S. PATENT DOCUMENTS 5,591,910 A * 1/1997 Lin .......................... 73/514.38
6,006,606 A * 12/1999 Shinogi et al. .......... 73/514.33

* cited by examiner

Primary Examiner—John E. Chapman
(74) Attorney, Agent, or Firm—Birch, Stewart, Kolasch & Birch, LLP

(57) ABSTRACT

An inertia device is constructed by both suspension structure and micro-electroplating structure. The suspension structure may be manufactured by surface micromachining technique of sacrificial layer process or bulk micromachining technique incorporating with thin film process. One side of the suspension structure is arranged firmly to a supporting piece, so that another side of the suspension structure is in a suspension state. The suspension side of the suspension structure is made as micro-electroplating structure through the micro-electroplating process and functions as inertia mass for an inertia sensor. The size of the micro-electroplating structure may be changed through the micro-electroplating process, such that the inertia sensor may be adapted for sensing in different levels. Furthermore, a micro-structure of high aspect ratio may be achieved by taking the advantage of a metal during the selection of a processing material, such that the objective for lateral sensing or driving signal may be fulfilled.

5 Claims, 7 Drawing Sheets

(a)

(b)

(c)

(d)

(e)

(a)

(b)

(c)

INERTIA SENSOR

This nonprovisional application claims priority under 35 U.S.C. § 119(a) on Patent Application No(s). 92121324 filed in TAIWAN on Aug. 5, 2003, which is(are) herein incorporated by reference.

FIELD OF THE INVENTION

The invention relates to an inertia sensor, and in particular, to a device with inertia mass, which size may be changed, formed upon suspension structure by micro-electroplating process.

BACKGROUND OF THE INVENTION

Currently, there are roughly four kinds of manufacturing techniques in Micro Electric Mechanical System (MEMS) applied for inertia sensor: surface micromachining, bulk micromachining, LIGA process, and other micromachining techniques.

Wherein, the surface micromachining is to apply thin film deposition and etching technique of semiconductor process to manufacture MEMS elements on chips. As shown in FIG. 1, the steps for constructing suspension structure by surface micromachining may be classified as follows:

(a) Depositing isolation layer 2 upon silicon wafer 1.

(b) Depositing sacrificial layer 3 upon isolation layer 2.

(c) Etching sacrificial layer 3 using lithography process.

(d) Depositing a suspension structure layer 4 upon the sacrificial layer 3.

(e) Generating suspension structure layer 4 by removing the sacrificial layer 3.

The bulk micromachining is applying etching techniques, such as: anisotropic etching, etch-stop technology and etching mask, etc. to etch single crystal silicon to fabricate MEMS elements. As shown in FIG. 2, the steps for bulk micromachining are classified as follows:

(a) Depositing thin film layer 2 upon wafer 1.

(b) Etching thin film layer 2 by lithography process.

(c) Etching the silicon wafer 1 to generate suspension structure layer 21.

LIGA technique applies the combination processes of X-ray etching, micro plating, and injection molding to manufacture microstructure with high aspect ratio. The micromachining process is to apply the techniques of cutting machining, micro electrostatic discharge machining, or injection molding, etc., to manufacture MEMS elements.

When applying aforementioned traditional MEMS techniques to inertia sensor design, there are two confronting bottlenecks: first, the microstructure is with high aspect ratio; second, a lateral sensing and signal driving objectives must be achieved by means of small intervals within the microstructure. Currently, the bulk micromachining is mostly applied in the design of inertia sensor, but such kind of designing manner is always incurred with the inaccurate alignment in the crystal direction of single crystal silicon substrate and the limitation in etching width. In addition, if the lateral sensing or signal driving arrangement is required, the arrangement of lateral electrodes is another troublesome problem.

As for existent etching techniques, such as: deep reactive ion etching (RIE), bulk silicon anisotropic etching, LIGA, etc., there are several shortcomings incurred:

1. For deep RIE, it is applying two major gases to protect the side wall and to etch at the same time, such that the purpose to etch the materials vertically is reached, but there are some inherent limitations on such kind of manufacturing manner technique: first, the etched materials must be silicon based, such that the purpose for protecting the side wall may be reached; if the size difference of each zone to be etched is large, the etched depths will be very differentiated as well, so it is impossible to reach equal-depth etching; in addition, although the micro intervals can be generated by the etching processes, it is impossible for other techniques to manufacture electrodes on side surfaces.

2. For bulk silicon anisotropic etching, it mostly applies the different etching speeds of etching liquid on the crystal lattice of single crystal silicon to reach the purpose of anisotropic etching, so the etching and non-etching areas defined prior to the etching process become a crucial factor for the accurate alignment on the original crystal lattice of single crystal silicon; furthermore, controlling the etching uniformity of entire wafer is also a big problem.

3. For LIGA process, it combines the lithography, electroforming, and molding to manufacture microstructure with high accuracy and high aspect ratio; the standard LIGA technique applies synchrotron radiation X ray as lithography, and the accuracy of the microstructure may reach sub-micro level, but it is expensive and complicated, so it has developed a trend for applying ultraviolet light, laser, or plasma as light source for LIGA-like technique and, since UV lithography process incorporated with thick film photo-resist technique may realize an UV-LIGA process of low cost.

The design structure of inertia sensing system made by common MEMS technique is mainly comprised of driving, sensing, and mass block parts. For current MEMS technique, an IC thin film process is preferably adopted, but the MEMS element manufactured by IC thin film process has extremely small bearing limitation for mechanical stress, so only static products subjected none or small stress have developed, such as: acceleration gauge, force sensor, and physic sensor combined with bio-medical sensing chip, etc. In the future, MEMS will march into the field of dynamic system, so how to promote the strength for sensing signals and how to control different sensing levels have become a very difficult challenge. Therefore, developing a high aspect ratio structure, increasing mass on suspension structure layer, and arranging electrodes on side faces are crucial factors in manufacturing an inertia micro-sensor.

As shown in FIG. 3 and FIG. 4, two inertia sensing systems made by MEMS are illustrated, where in a bulk micromachining process is applied to form the suspension structure layers 21a, 21b and the inertia mass blocks 22a, 22b. The inertia mass blocks 22a, 22b are arranged below the suspension structure layers 21a, 21b. Since inertia mass blocks 22a, 22b are made of single crystal and non-conductive materials, so the suspension structure layers 21a, 21b and the inertia mass blocks 22a, 22b can only reciprocate up and down and can not be applied in lateral sensing or signal driving arrangement.

SUMMARY OF THE INVENTION

According to the shortcomings of the prior arts, the main objective of the invention is to provide an inertia sensor, wherein inertia mass block is formed on suspension structure by micro-electroplating process, and the size of the inertia mass block may be changed for being adapted to sense in different levels. By selecting metal as advantageous material in the process, it is possible to reach the objective of lateral sensing and signal driving arrangement in a microstructure of high aspect ratio.

The secondary objective of the invention is to provide an inertia sensor capable of realizing the designing goal of high aspect ratio structure, and its cost is also cheaper than that of other process of high aspect ratio.

Another objective of the invention is to provide an inertia sensor, wherein its suspension structure has conductivity, such that lateral sensing or signal driving functions may be reached.

The further objective of the invention is to provide an inertia sensor, wherein its processing temperature is low, its compatibility with other processes is high, and it may be combined to MOS to reach systematic integration.

The further another objective of the invention is to provide an inertia sensor wherein, on one hand, it has reinforcing structure for suspension structure, on the other hand, it may suppress or change the vibration mode.

Following drawings are presented to describe the detailed structure and its connective relationship according to the invention for facilitating in understanding the characteristics and the objectives of the invention.

DETAILED DESCRIPTION OF THE INVENTION

Figure 1:
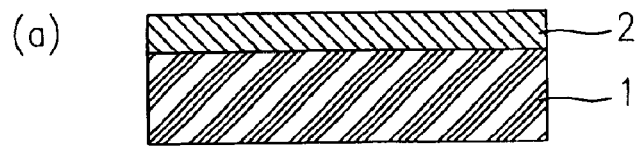
FIG. 1 shows the steps for the surface micromachining according to prior arts.
Figure 1:
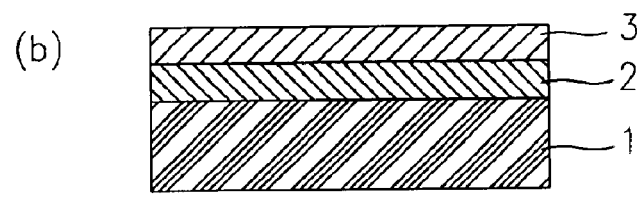
Figure 1:
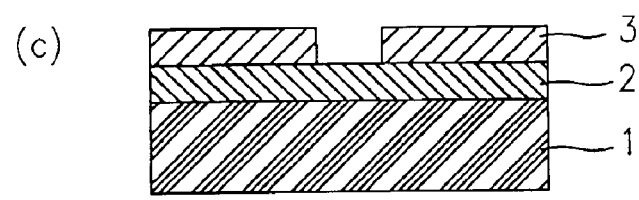
Figure 1:
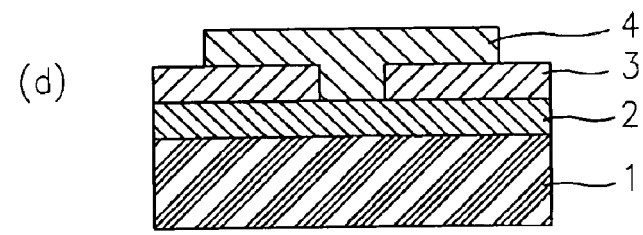
Figure 1:
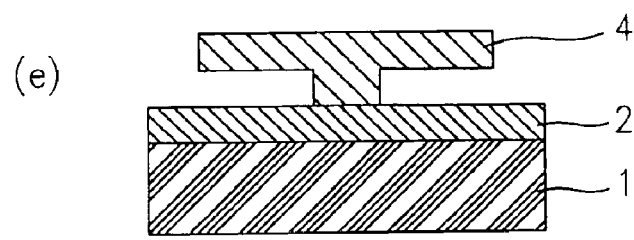
Figure 2:
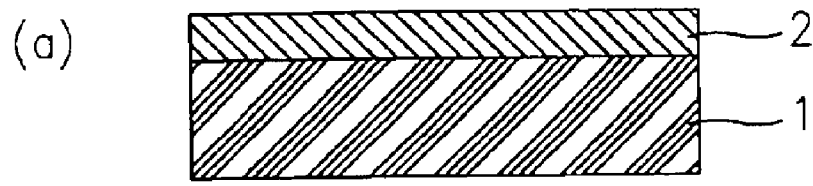
FIG. 2 shows the steps for the bulk micromachining according to prior arts.
Figure 2:
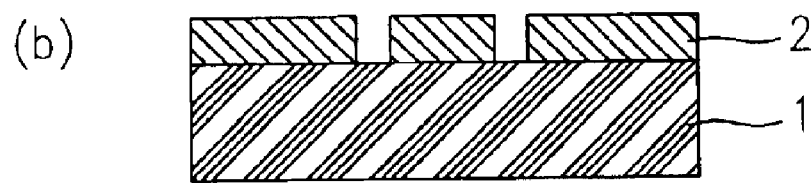
Figure 2:
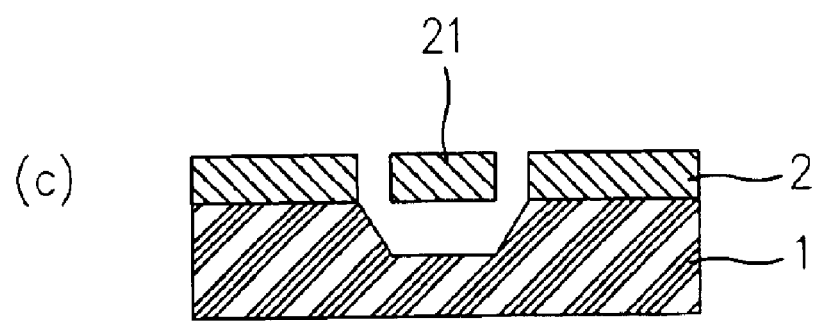
Figure 3:
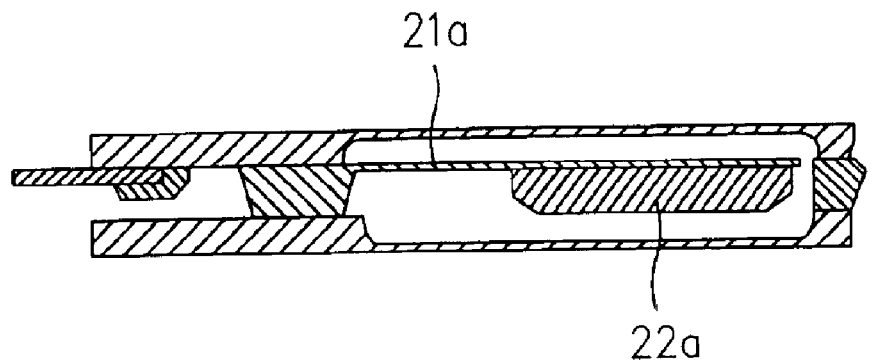
FIG. 3 and FIG. 4 are two structural illustrations for inertia sensing micro-system made by MEMS technique according to prior arts.
Figure 4:
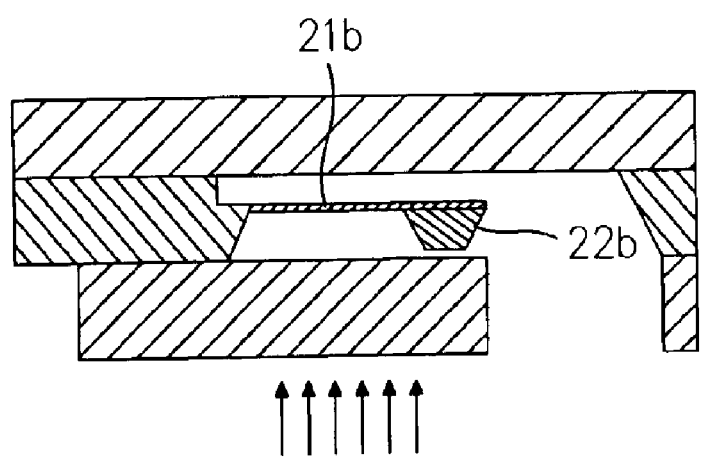
Figure 5:
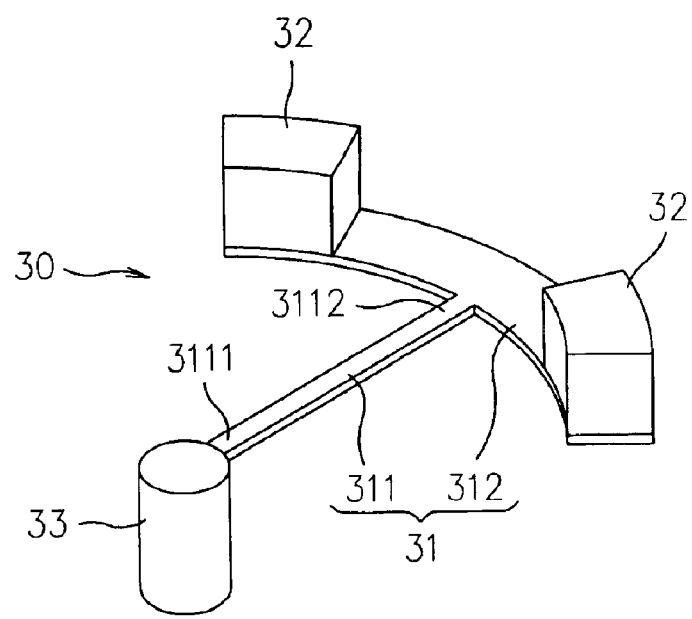
FIG. 5 is a perspective diagram for a preferable embodiment according to the invention.

Please refer FIG. 5, which shows an embodiment for an inertia sensor according to the invention. The inertia sensor 30 is comprised of a suspension structure 31 and a micro-electroplating structure 32. The suspension structure 31 has an arm 311, one side 3111 of which is connected to a supporting piece 33, and another side 3112 of which is shown as suspending state and is extended horizontally to two sides to form a platform 312 by taking the arm 311 as center. A micro-electroplating structure 32 is respectively arranged at two sides on top of the platform 312.

Figure 6:
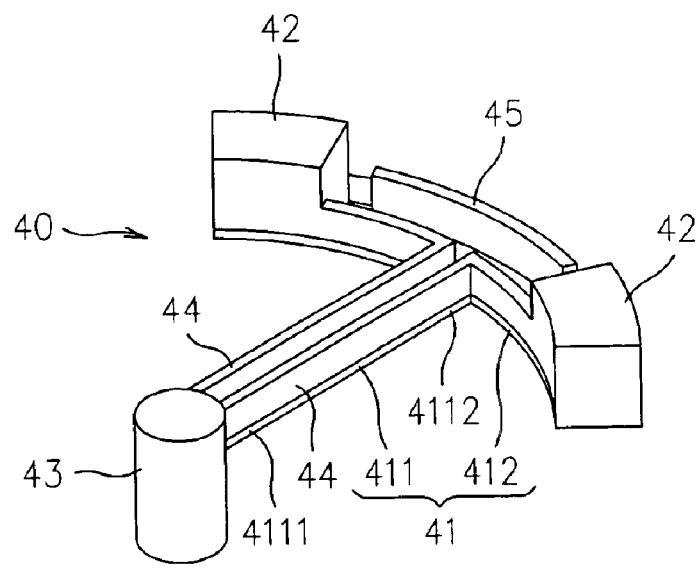
FIG. 6 is a s perspective diagram for another preferable embodiment according to the invention.

Again, please refer to FIG. 6, which shows another embodiment for the inertia sensor. The inertia sensor 40 is comprised of a suspension structure 41 and a micro-electroplating structure 42. The suspension structure 41 has an arm 411, one side 4111 of which is connected to a supporting piece 43, and another side 4112 of which is shown as suspending state and is extended horizontally to two sides to form a platform 412 by taking the arm 411 as center. A micro-electroplating structure 42 is respectively arranged at two sides on top of the platform 412. The characteristic of this embodiment is that there are reinforcing structures 44, 45 arranged at the top edges of platform 412 and arm 411. Wherein the reinforcing structure 44 is located at two top sides of the arm 41 and is extended inside the platform 412 and is further connected to the micro-electroplating structure 42. The reinforcing structure 44 is made of conductive material and not only has reinforcing function but also can increase sensing area. The platform 412 located outside the reinforcing structure 45 is purely for the reinforcing function, so there is no limitation for its materials, but one thing should be noted: the reinforcing structure 45 is not connected to the micro-electroplating structure 42.

Please refer to the processing steps concerning the inertia sensor according to the invention. Thereby, the detailed disclosure of the invention may be thoroughly understood.

Figure 7:
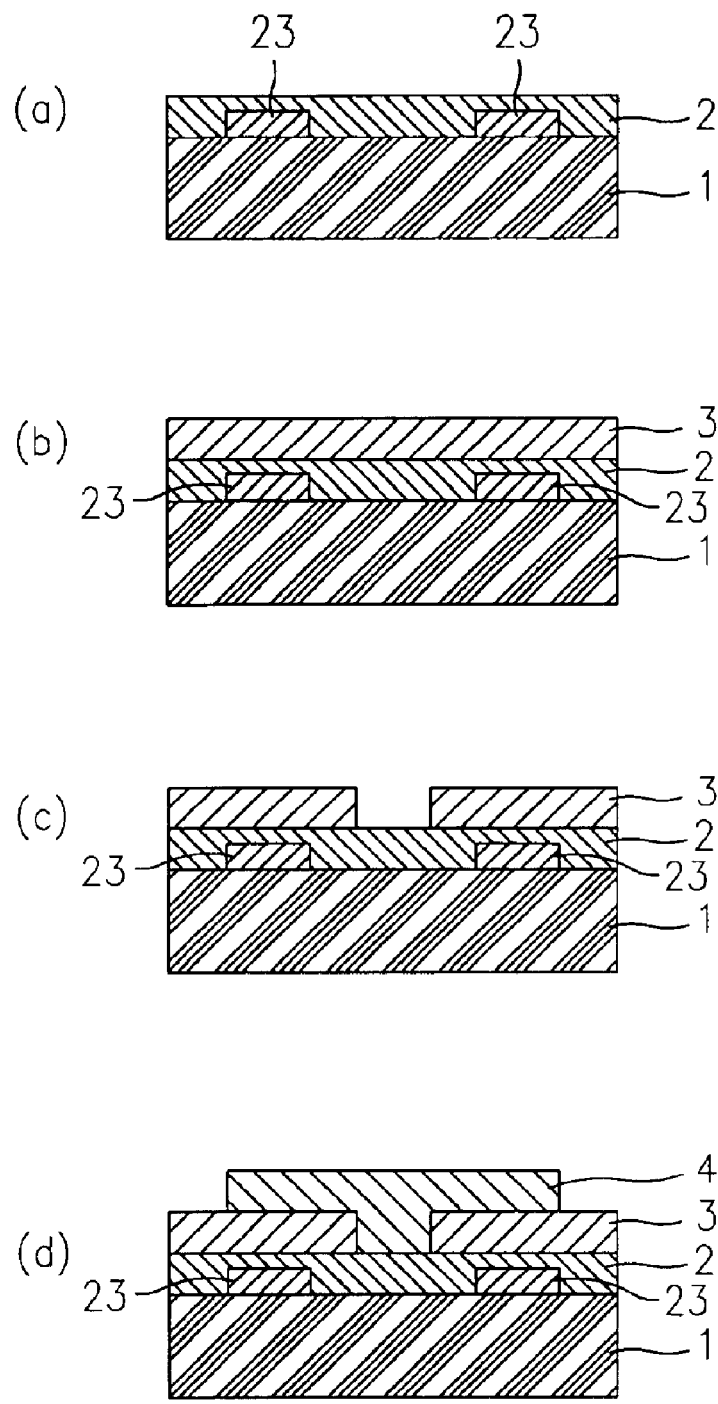
FIG. 7 shows the steps for processing the suspension base structure according to the invention.

First, please refer to FIG. 7, which means that the invention must has a suspension-based structure 10, of which manufacturing process includes following steps:

(a) Preparing a silicon wafer 1, on which $SiO_2$, $Si_3N_4$ are provided as isolation thin film (not shown in the figures) with respect to the silicon substrate; secondly, a metallic material is chosen as electrode 23 for driving signals; then $Si_3N_4$ is deposited upon the silicon wafer 1 to function as isolation layer 2, on which connecting paths for signals are arranged.

(b) Sacrificial layer 3 is deposited upon isolation layer 2 through LPCVD (Low Pressure Chemical Vapor Deposition) method.

(c) Defining an etching area of sacrificial layer 3 for lithography process.

(d) A suspension structure layer 4 is formed by depositing poly-silicon on the sacrificial layer 3 through LPCVD method.

Figure 8A:
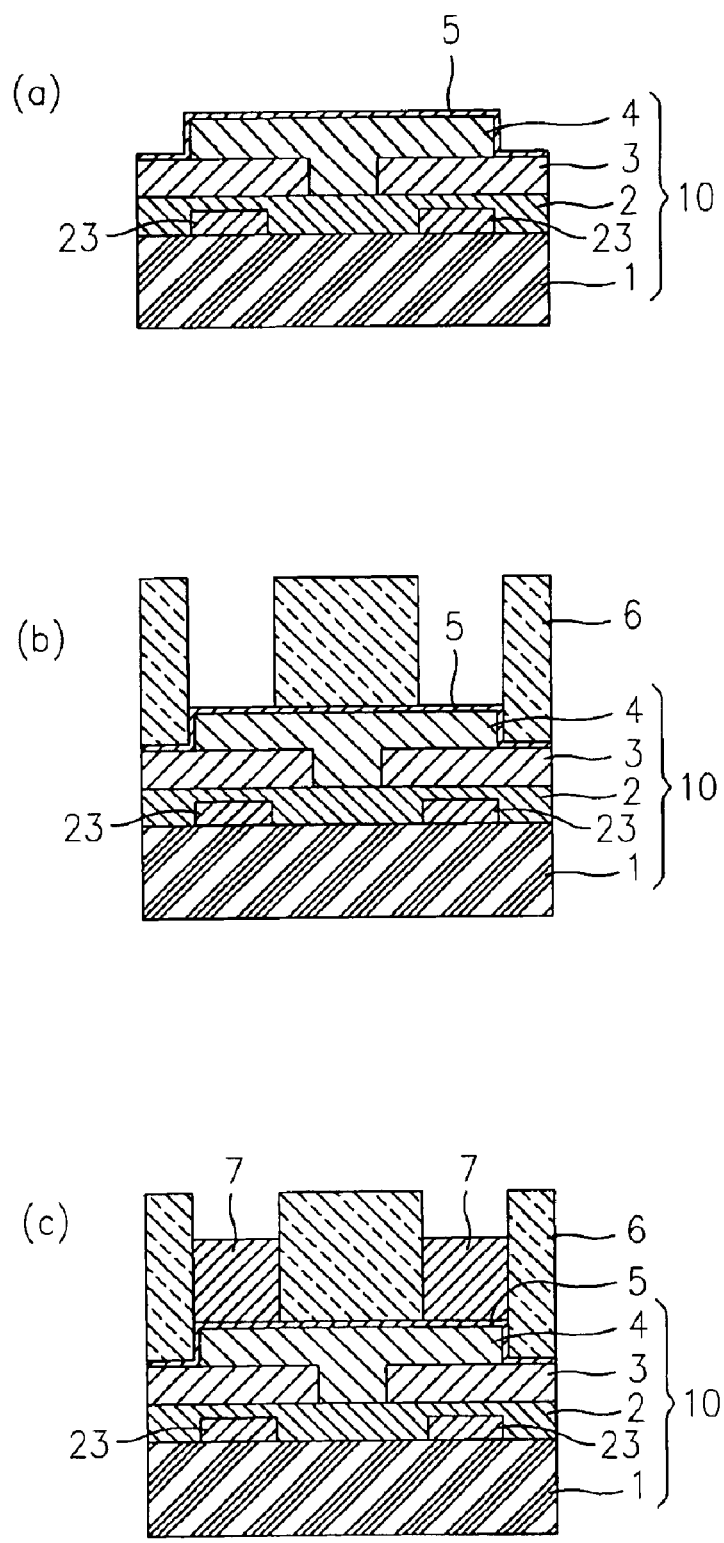
FIG. 8A and FIG. 8B show the steps for processing the micro-electroplating structure according to the invention.
Figure 8B:
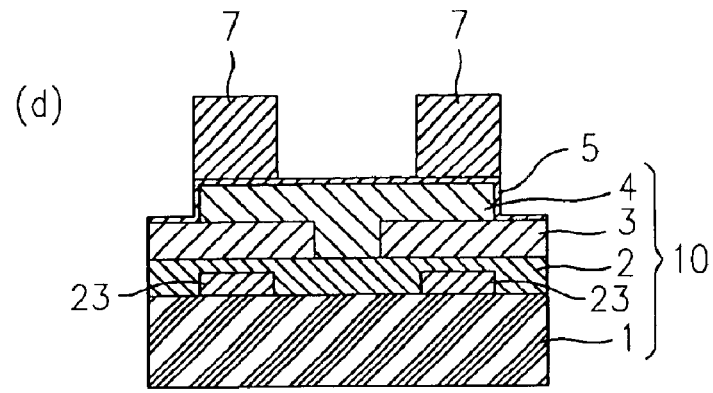
Figure 8B:
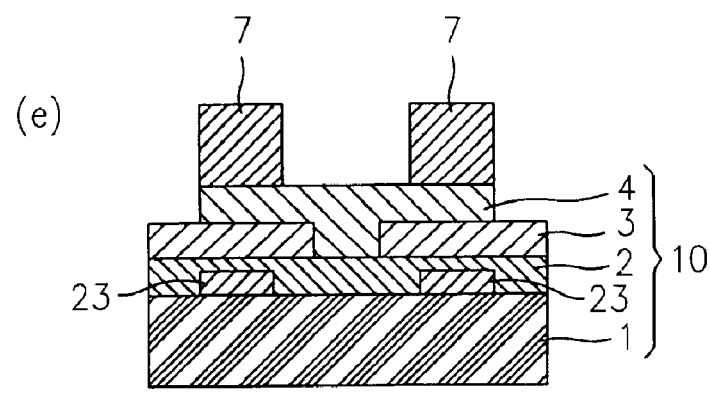
Figure 8B:
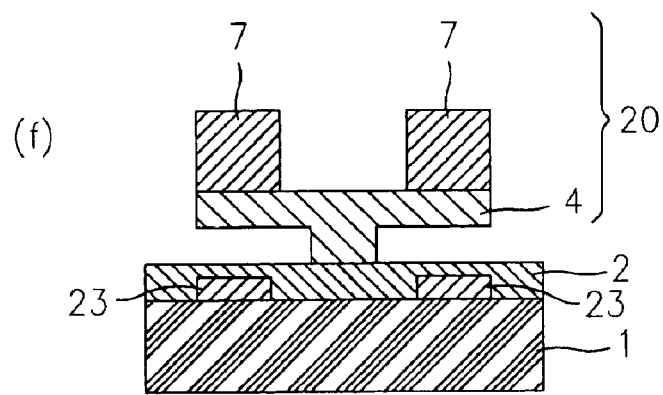

After the suspension-based structure 10 is made through aforementioned steps, a micro-electroplating structure is further processed. Please refer to FIG. 8A and FIG. 8B, which include following steps:

(a) A plating seed layer 5 is plated by lithography process upon the suspension-based structure 10, and the plating seed layer 5 may be made of Aluminum (Al) or Chromium (Cr).

(b) A thick film photo-resist 6 may be set up upon the plating seed layer 5 by lithography process.

(c) A metallic plating layer 7 is formed between the thick film photo-resists 6 by micro-electroplating process, and the metallic plating layer 7 may be made of Aluminum (Al) or Chromium (Cr), and the material of the metallic plating player 7 appropriately adopts the same material as that of the plating seed layer 5.

(d) The thick film photo-resist 6 is removed by lithography process.

(e) The plating seed layer 5 is removed by lithography process as well, and one thing must be pointed out is that the plating seed layer 5 located at bottom of the metallic platting layer 7 may be integrated with the metallic plating layer 7 as one body when the latter is under electroplating process, so no plating seed layer 5 is presented herein any more.

(f) Finally, the sacrificial layer 3 is removed by lithography process to form a suspension structure body 20 constructed by suspension structure layer 4 and metallic plating layer 7; Comparing step (f) of FIG. 8B with FIG. 5, the metallic plating layer 7 is equivalent to micro-electroplating structure 32, and the suspension structure layer 4 is equivalent to arm 311.

In summary, the invention has following advantages:

1. The size of the inertia mass of the sensor may be changed by means of the thickness variation of the metallic plating layer, such that it may be adapted for sensing function of different levels.

2. The design goal of high aspect ratio may be realized under the condition of low cost.

3. The suspension structure body has conductivity, such that lateral driving and sensing become possible.

4. The processing temperature is low, compatibility with other processes is high, and it may combine with MOS to achieve system integration.

5. Reinforcing structure may also be constructed upon the suspension structure body, on one hand, to reach reinforcing effectiveness and, on the other hand, to suppress or change the vibration mode.

However, the aforementioned description is just several preferable embodiments according to the invention and, of course, can not limit the executive range of the invention, so any equivalent variation and modification made according to the claims claimed by the invention are all still belonged to the field covered by the present invention.

What is claimed is:

1. An inertia sensor includes:
   a suspension structure, one side of the suspension structure being connected firmly to a supporting piece, and another side of the suspension structure being in a suspending state, the suspension structure further comprising an arm and a platform, one side of the arm being arranged firmly at the supporting piece, another side of the arm being in the suspending state, the platform being arranged at the one side of the arm and being in the suspending state, the platform being configured by horizontally extending a specific length to form two top sides of the platform and taking the arm at a center of the two top sides of the platform; and
   a micro-electroplating structure being formed at another side of the suspension structure by micro-electroplating process and being in the suspending state with a specific altitude, the micro-electroplating structure being respectively arranged at the two top sides of the platform;
   a reinforcing structure, the reinforcing structure including an inside reinforcing structure and an outside reinforcing structure, the inside reinforcing structure being arranged at the two top sides of the arm and being extended along the inside of the platform and being connected to the micro-electroplating structure, the outside reinforcing structure being arranged at the outside of the platform and being not connected to the micro-electroplating structure.

2. The inertia sensor according to claim 1, wherein the suspension structure is a vibratory structure arranged on the inertia sensor.

3. The inertia sensor according to claim 1, wherein the suspension structure is processed by surface micromachining, or by bulk micromachining technique incorporating with thin film technique.

4. The inertia sensor according to claim 1, wherein the suspension structure includes a supporting structure, a signal-connecting path, and a signal-isolation layer.

5. The inertia sensor according to claim 1, wherein the micro-electroplating process includes the steps of:
   (a) preparing a suspension-based structure;
   (b) electroplating a plating seed layer upon the suspension-based structure;
   (c) setting up a thick film photoresist of isolation upon the plating seed layer;
   (d) forming a metallic plating layer having a specific thickness between each thick film photoresist;
   (e) removing the thick film photoresist;
   (f) removing the plating seed layer; and
   (g) removing a sacrificial layer, and forming a suspension structure constructed by both a suspension structure layer and the metallic plating layer.

* * * * *